United States Patent [19]

Peters

[11] Patent Number: 5,167,742
[45] Date of Patent: Dec. 1, 1992

[54] METHOD AND DEVICE FOR PRODUCING A TAPERED SCARF JOINT

[75] Inventor: Stanley T. Peters, Mt. View, Calif.

[73] Assignee: Westinghouse Electric Corp., Pittsburgh, Pa.

[21] Appl. No.: 706,715

[22] Filed: May 29, 1991

[51] Int. Cl.⁵ .................... B65H 81/00; B29C 57/00
[52] U.S. Cl. ..................... 156/175; 156/159; 156/173; 156/258; 156/304.2; 156/304.5; 156/425; 156/510; 138/109
[58] Field of Search ................. 82/113; 156/258, 159, 156/304.2, 304.5, 169, 173, 175, 425, 510; 138/109; 285/423

[56] References Cited

U.S. PATENT DOCUMENTS

| | | |
|---|---|---|
| 3,379,591 | 4/1968 | Bradley . |
| 3,388,932 | 6/1968 | Bradley ........................... 138/109 X |
| 3,540,328 | 11/1970 | Foss ..................................... 82/113 |
| 4,187,135 | 2/1980 | Yates et al. . |
| 4,236,386 | 12/1980 | Yates et al. . |
| 4,238,540 | 12/1980 | Yates et al. . |
| 4,259,382 | 3/1981 | Schwan . |
| 4,755,406 | 7/1988 | Fuchs . |

FOREIGN PATENT DOCUMENTS 1188270 3/1965 Fed. Rep. of Germany .

OTHER PUBLICATIONS

Peters et al., Filament Winding, from Engineered Materials Handbook, vol. 1, Composites by A.S.M. International, 1987, p. 502–518.

Primary Examiner—Jeff H. Aftergut

[57] ABSTRACT

A device and method for producing a tapered scarf joint between two composites includes a cutting guide for cutting plies to incrementally variable lengths. The joint is produced on a filament winding machine having a mandrel and a winding eye for delivering tacky prepreg filament bands. A first helical ply is wound around the mandrel. Next, a cutting guide edge is positioned over the first ply an incremental distance inward from the ply end. As the next helical ply is wound, the filaments are cut at the cutting guide edge. The cut filament ends are pressed against the first ply. The process is repeated N times. The cutting guide is then removed from the mandrel, and a final ply is wound over the entire length of the composite. Similarly, the same cutting guide is then used to produce an outwardly tapered composite end. Only this time the cutting guide edge is positioned incrementally outward along a tapered wedge attached to one end of the mandrel. Finally the inwardly tapered composite end is adhesively attached to the outwardly tapered composite end, thereby producing a relatively inexpensive high strength composite joint without increasing composite thickness.

16 Claims, 3 Drawing Sheets

METHOD AND DEVICE FOR PRODUCING A TAPERED SCARF JOINT

FIELD OF THE INVENTION

The invention relates to filament wound composite joints. In particular, the invention involves a relatively inexpensive device and method for producing a high strength joint between two tubular composites, without increasing composite thickness.

BACKGROUND OF THE INVENTION

Filament wound composites are frequently used in industries where large high strength tubular structures are required. For example, filament wound composites are used in the defense industry to make missile capsules and torpedo tube launch capsules. These composites are also used to make large pipes for transporting liquid such as oil and well water. The primary advantages in using filament wound composite materials is that they can be inexpensively produced, and the composites have exceptionally high strength and stiffness characteristics and are non-corrosive.

The filament winding process is based on high-speed precise lay-down of filaments, usually glass or graphite, in predescribed patterns. The process involves winding continuous resin-impregnated rovings or bands, i.e., gathered strands of filaments, over a male mandrel. The mandrel can be cylindrical, round, or any shape that does not have re-entrant curvature. The bands may be wrapped either in adjacent bands or in repeating bands that are stepped the width of the band and which eventually cover the mandrel surface. The technique has the capacity to vary the winding tension, wind angle, or resin content in each layer of reinforcement until the desired thickness and resin content of the composite are obtained with the required direction of strength.

One of the problems associated with the filament winding technology is how to join two tubular composites. Numerous types of composite joints have been designed, most of which involve some type of male-female connection, usually increasing the overall joint thickness in the joint area. For example, the bell and spigot joint involves an enlarged female composite end adapted to receive a male composite end. The result is a joint having an enlarged outer diameter. Variations of the bell and spigot joint include the mechanical joint, the threaded and bonded joint and the O-ring joint. All of these joints are relatively thick compared to the rest of the composite, making such joints unsuitable for applications which have tight stacking or storage requirements.

Thus, it is advantageous to produce a shallow tapered scarf joint. Such a joint provides a connection between two thin wall composite structures without the need for intervening metal or other material sections. The joint is advantageous in that it transfers loads gradually, without abrupt metal-to-composite transitions, which can cause stress concentrations or a discontinuity in coefficients of thermal expansion. Further, in a tapered scarf joint the composite thickness is constant between the composites and throughout the joint.

Tapered scarf joints have been used in the aircraft and aerospace industries to join composite structures. However, they have not been used with filament wound composites. The reason is that there have been only two cost-prohibitive ways to produce such a joint which has both hoop and helical fibers. One way to produce a tapered scarf joint is by manually machining the two composite ends. The other way is to use a 6-axis numerically controlled filament winding machine which requires elaborate computer control means for precisely cutting successive composite plies to variable lengths. Only a limited number of these machines are in existence, and they are exceptionally expensive. In contrast, conventional filament winding machines are relatively common and inexpensive.

Therefore, it is an object of the present invention to produce a high strength relatively inexpensive joint between two filament wound composite tubes, by modifying a conventional filament winding machine.

Another object is to produce such a joint without inserting additional parts into the joint, and without increasing either the inner or outer diameters of the tubes.

SUMMARY OF THE INVENTION

The above objects are accomplished with the method and device of the present invention in which a conventional filament winding machine is fitted with a cutting guide disposed near one end of a rotating mandrel. The cutting guide is situated so that it does not interfere with the travel of the winding eye or the laydown of the fiber, either on the cylinder or the dome. The cutting guide remains in the same fixed position relative to the winding machine as the mandrel rotates beneath it. The cutting guide allows the band of fiber to essentially remain attached to the cylindrical section and the dome so that the winding path is not disturbed. Each time the fiber band goes over the bar the fiber band is cut and the fiber ends pushed down on both the dome and the cylindrical section by a cutting tool which cuts across the fiber band. The cutting tool may be operated hydraulically, pneumatically or mechanically in response to the movement of the wind eye.

An inwardly tapered filament wound tubular composite end is produced by incrementally moving a cutting guide edge inwardly as successively shorter helical filament plies are wound and cut. Next, an outwardly tapered filament wound tubular composite end is produced by incrementally moving the cutting guide edge outwardly as successively longer filament plies are wound and cut. The taper angles of the two composite ends compliment each other, insuring maximum strength and balance in the joint. Finally, the two tubular composite ends are adhesively joined.

DETAILED DESCRIPTION OF THE PREFERRED EMBODIMENTS

The device and method of the present invention involve modifying a conventional filament winding machine to include a cutting guide tool. The cutting guide allows successive plies of prepreg filament bands to be precisely trimmed to variable lengths. By using this device, complimentary inward and outward tapered composite ends can be produced. The tapered composite ends are then adhesively bonded creating the desired tapered scarf joint.

Throughout the specification, the terms "inward" and "outward" taper are used. "Inward taper" is defined as a gradually decreasing outer diameter of the tube at one end. "Outward" taper is defined as a gradually increasing inner diameter of the tube at one end. The taper configurations are so defined since the inwardly tapered composite end is produced by moving the cutting guide incrementally inward relative to the tube. Whereas, the outwardly tapered composite end is produced by moving the cutting guide incrementally outward relative to the tube.

Figure 1:
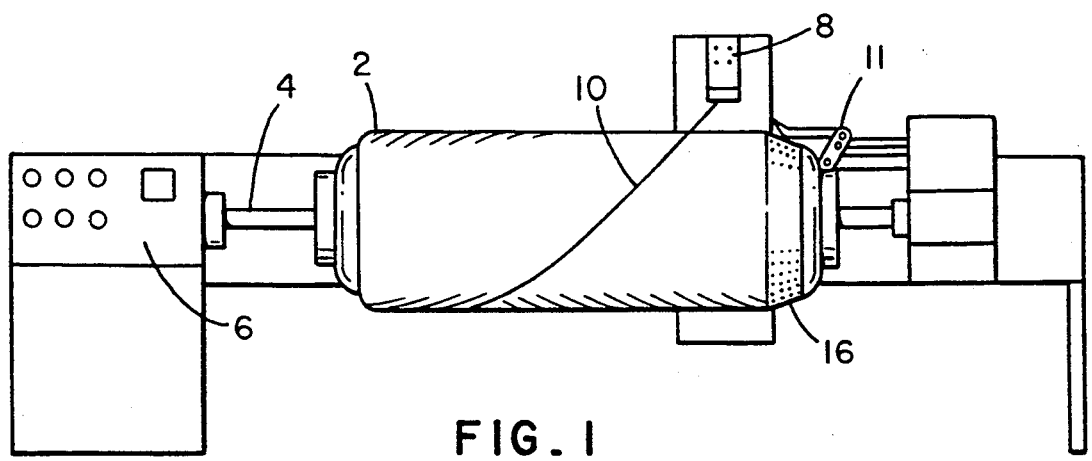
FIG. 1 is a side view of a conventional filament winding machine which has been adapted in accordance with the present invention.

In FIG. 1 a filament winding machine includes a mandrel 2 which is rotatable around an axis at the core of a shaft 4. The shaft 4 is connected to a driving means 6 which controls the rotation of the mandrel 2. A winding eye 8 delivers resin-impregnated ("prepreg") bands 10 (gathered strands of fibers) to the mandrel surface. An appropriate resin for this purpose is Hercules 3501-6. The winding eye is adapted to reciprocate along a line parallel to the mandrel axis. A cutting guide 11 is positioned at one end of the mandrel 2.

Figure 2A:
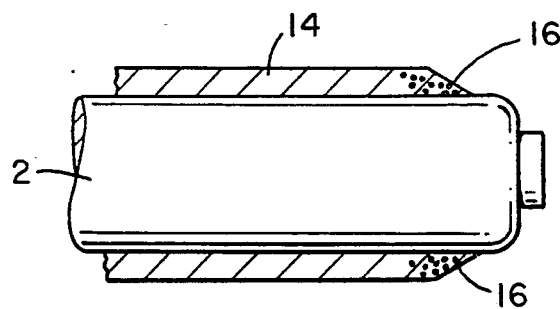
FIG. 2a is a partial sectional view of a mandrel having an inwardly tapered filament wound composite disposed thereon.
Figure 2B:
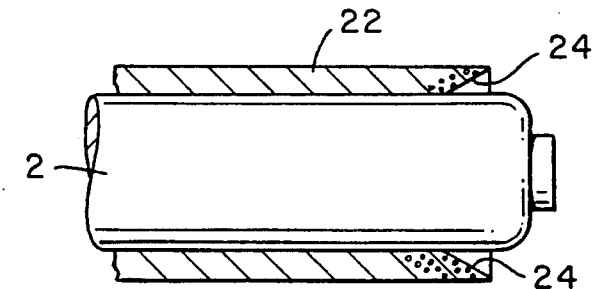
FIG. 2b is a partial sectional view of a mandrel having an outwardly tapered filament wound composite disposed thereon.
Figure 2C:
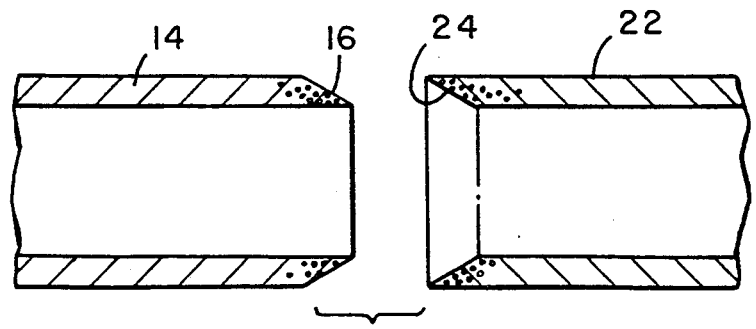
FIG. 2c is an exploded sectional view of a tapered scarf joint.

FIGS. 2a-2c show generally how a tapered scarf joint is produced in the present invention. FIG. 2a shows a portion of the mandrel 2 having a tubular composite 14 wound around the outside surface of the mandrel. One end of the composite 16 is produced to have an inward taper.

Similarly, FIG. 2b shows a portion of a mandrel 2 having a tubular composite 22 wound around the outside surface of the mandrel. One end of the composite 24 has an outward taper adapted to compliment the inward tapered end of composite 14. The taper angles of composite ends 16 and 24 are preferably equal to insure maximum joint strength and balance.

FIG. 2c shows how the two composites 14 and 22 are joined. The inwardly tapered composite end 16 is adhesively attached to the outwardly tapered composite end 24. The composite ends may be reversibly bonded by using a polyamide cured adhesive such as Hughson/Lord FUSOR 304, or a hot melt adhesive such as 3M's SCOTCHWELD 4060. These joints can be made and broken by applying heat. Another suitable adhesive for bonding the composite ends is film adhesive AF-163-2 made by Minnesota Mining and Manufacturing Inc.

Figure 3:
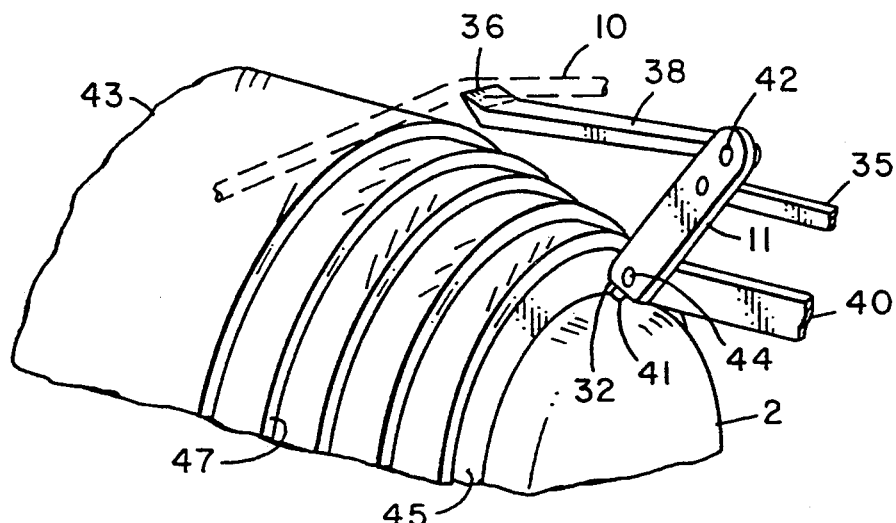
FIG. 3 is a partial perspective view of an embodiment of the present invention.

A preferred embodiment of the invention, as shown in FIG. 3, includes a cutting guide 11 positioned on a shoulder 32 of the mandrel 2. The various elements of the cutting guide will be discussed below in more detail with reference to FIGS. 4 and 5.

As shown in FIG. 3, the cutting guide edge 36 supports the filament band 10 which is provided by the winding eye (not shown). The band 10 will then be cut at the cutting guide edge. The cutting guide edge is moveable along a line which is parallel to the mandrel axis of rotation. Thus by moving the cutting guide edge inward from the composite end 45, successively shorter composite plies can be produced creating an inward taper 47 at one end of the composite 43.

Figure 4:
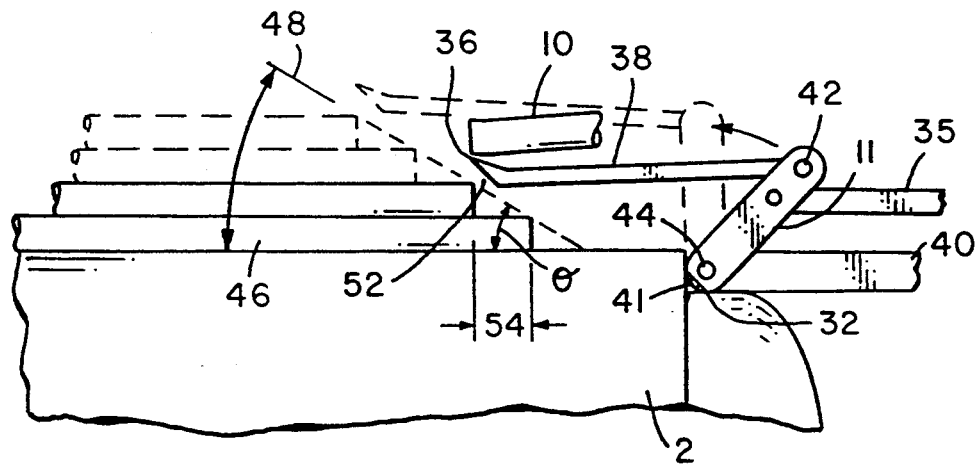
FIG. 4 is a partial sectional view showing an embodiment of a cutting guide, as used to produce an inwardly tapered composite end in the present invention.

FIG. 4 illustrates how a cutting guide is used to produce an inwardly tapered composite end. The mandrel 2 has a shoulder 32 for supporting the cutting guide 11. The cutting guide 11 has an edge 36 disposed at one end of a rigid bar member 38. In a preferred embodiment the bar member 38 is connected to a main body portion 40 by two pivot joints, such as hinges 42 and 44. The hinges allow bar member 38 to translate in a direction parallel to the mandrel axis, while the cutting guide main body portion 40 is maintained in a fixed location on the mandrel shoulder 32. The cutting guide main body portion 40 is also equipped with a roller 41 for minimizing friction between the rotating mandrel 2 and the cutting guide 11.

As shown in FIG. 4, a gap 52 is maintained between the cutting guide and the composite. The gap prevents the cutting guide from sticking to the tacky resin impregnated composite layers.

The filament winding machine is also provided with a means 35 for precisely urging the bar member to translate incremental distances, for example fifteen to twenty thousandths of an inch (approximately 0.4–0.5 millimeters), parallel to the mandrel axis. A separate motor or other driving means may be connected to the cutting guide bar member for this purpose. Provision is also made for moving the cutting guide completely away from the winding path during hoop winding.

A first helical ply 46 is shown on the mandrel surface. A broken line 48 shows the objective composite profile. Filament band 10 contacts the cutting guide edge 36 under tension applied by the winding eye (not shown). By cutting the band 10 and other helically wound bands around the circumference of the mandrel as they are laid, a second ply is created. The second ply will have a shorter length than the first ply by an increment 54. Once the second ply is complete the cutting guide will be moved an additional increment inward from the composite end allowing a third ply to be created which is incrementally shorter than the second ply.

As the band is cut at the cutting guide edge two band ends are created. The first band end is connected to the composite. The second band end is connected to the winding eye and to the dome section outboard of the mandrel.

The first band end is pressed against the surface of the previously wound ply, by either the cutting blade itself or a separate bar or pad member which is provided specifically for that purpose. In one embodiment the bar or pad member reciprocates along a line perpendicular to the mandrel axis in sync with the cutting means.

Similarly, as the band is cut at the cutting guide edge, the second band end is simultaneously pressed against the previously wound ply or composite which covers the dome, so that the band remains attached to the composite as the winding eye proceeds to translate toward the other end of the mandrel. Again, this pressure step can be performed by the cutting means itself, or by a separate bar or pad member which reciprocates perpendicular to the mandrel axis in sync with the cutting means.

The process of cutting bands to form a ply, then moving the cutting guide incrementally inward, is repeated N times until the composite reaches the desired thickness. In some composites there may be as many as forty plies of helically wound prepreg filaments. There may also be 90° plies commingled with the helical plies. However, the cutting guide of the present invention acts only on the helically wound fibers to form the tapered composite ends.

Once N plies have been wound and cut, the cutting guide is removed from the mandrel. Next, a final ply is helically wound over the entire length of the deposit, including the tapered end. This final ply serves to protect the inclined face and reduce risk of delamination when mating the joint.

Preferably, a metal sleeve which has a surface which will release from the composite, is placed around the tapered end of the composite, which is then allowed to cure. The sleeve fixes and preserves the integrity of the tapered end during curing and can be easily removed prior to bonding composite ends to complete the joint.

Figure 5:
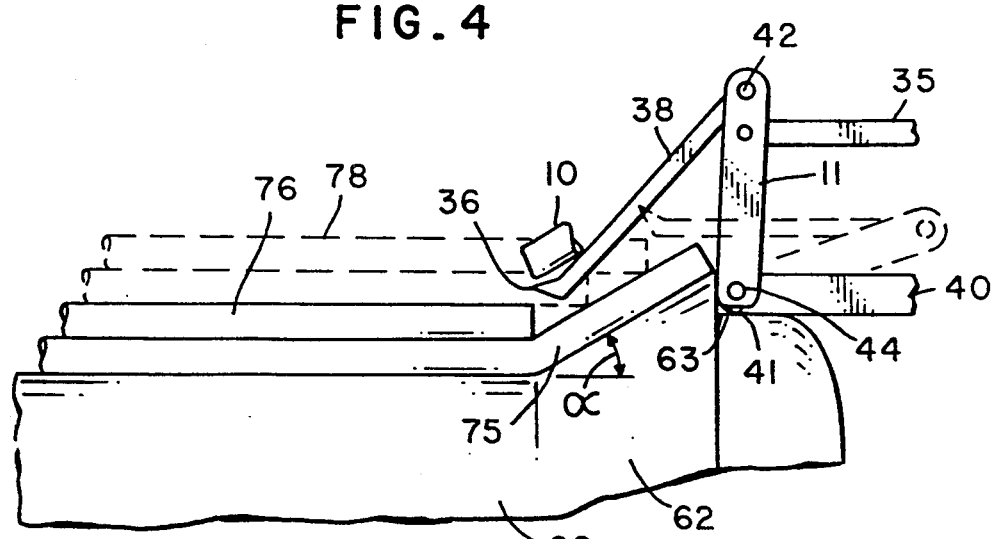
FIG. 5 is a partial sectional view showing an embodiment of a cutting guide, as used to produce an outwardly tapered composite end in the present invention.

FIG. 5 shows how the same cutting guide can be used to create an outwardly tapered composite end which will compliment the inwardly tapered composite end of FIG. 4. The mandrel 60 has a tapered wedge 62 attached at one end. The tapered wedge may be an integral part of the mandrel, or it may be a removable attachment. The angle of the wedge taper $\alpha$ should be equal to the taper angle $\theta$ of the inwardly tapered composite of FIG. 4. In FIG. 5 the cutting guide 11 sits on a shoulder 63 of the tapered wedge 62. The two cutting guide hinges 42 and 44 allow the cutting guide edge 36 to translate along the tapered wedge incline.

A first helically wound ply 75 is shown extending up the tapered wedge incline. Similar to the final ply of the inwardly tapered composite, ply 75 serves to protect the incline face of the outwardly tapered composite, reducing the risk of delamination when mating the joint.

After the first ply has been wound up the tapered wedge 62, the cutting tool 11 is mounted on shoulder 63. Preferably, there is a gap between rigid bar member 38 and first ply 75, thus avoiding any disruptive adhesion between the cutting guide and the tacky prepreg filaments.

Next, a second helical composite ply 76 is wound around the outside of first ply 75. Second ply 76 ends at the base of the tapered wedge 62, i.e. the "incline point". The shortened end of ply 76 is produced by positioning the cutting guide edge 36 at the incline point of the tapered wedge. The filament bands are then cut at the cutting guide edge 36.

As shown in FIG. 5, the cutting guide edge may be moved outwardly an additional increment up the tapered wedge incline, so that additional plies may be produced. By cutting the filaments at the cutting guide edge 36 a third ply of composite filaments is created which is longer than the second ply by the incremental distance. Successively longer helical plies are created by continuing to move the cutting guide edge up the tapered wedge incline. The broken line 78 shows the objective profile of the outwardly tapered composite.

As with the inwardly tapered composite, once the filament cutting and tool moving steps have been repeated to produce N plies in addition to the first two, the cutting guide is removed and a final ply is wound.

Then a metal sleeve is placed around the tapered end, and the composite having N+3 helically wound plies is allowed to cure.

Once the composites are cured, the metal sleeve is removed and the tapered ends of the composites are adhesively bonded. Preferably, the wind angles, ply orientations and fiber volumes of the two composites are the same, insuring uniform stiffness in the joint.

Figure 6:
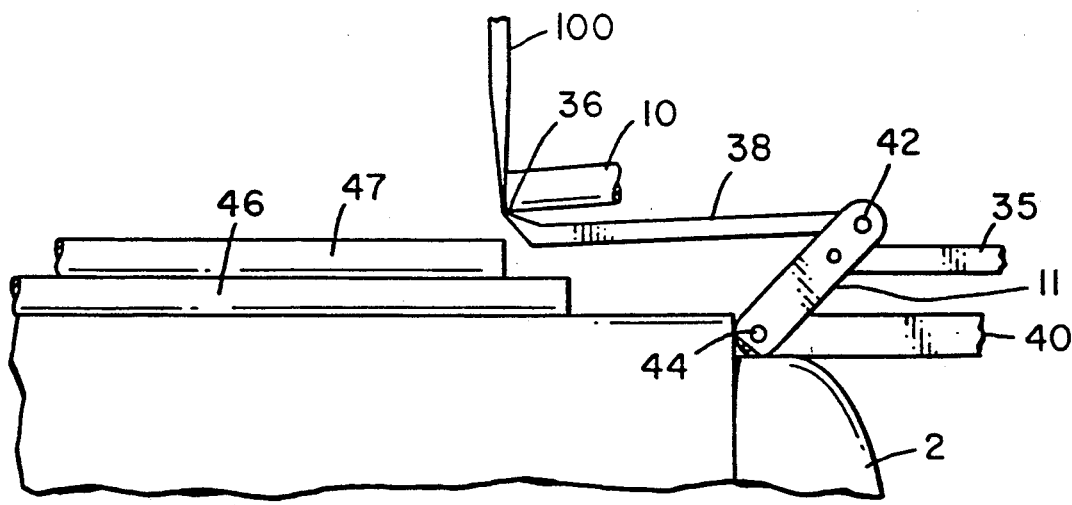
FIG. 6 is a partial sectional view illustrating a band cutting method of the present invention.

FIG. 6 illustrates how bands are cut in a preferred embodiment of the present invention. The cutting guide edge 36 is disposed above a first composite ply 46 in order to produce a second shorter composite ply 47. Filament band 10 contacts cutting guide edge 36 until blade 100 cuts band 10. Then the band is pressed against the first ply surface. Blade 100 may be a razor blade, an ultrasonic knife or any other equivalent cutting instrument. Alternatively, the cutting guide edge 36 could be sharp enough to cut the band without an additional blade. However, as described above, some type of physical pressure means must be provided to press the severed tacky band ends against the previously wound ply, immediately after the band is cut.

Figure 7:
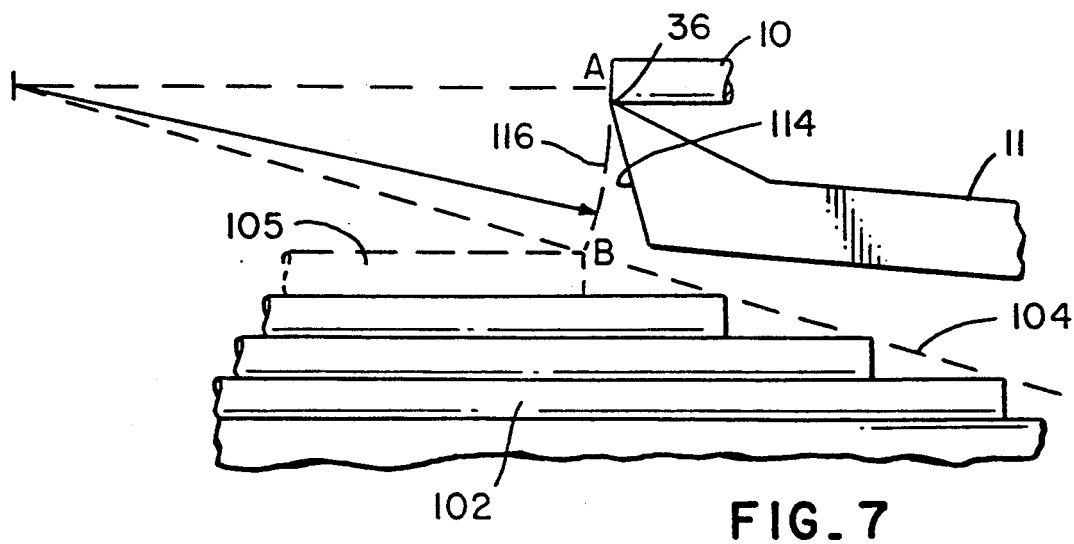
FIG. 7 is a partial sectional view illustrating how filament ends are laid down in the present invention.

FIG. 7 shows the relationship between the cutting guide edge and the cut filaments. Previously cut composite plies 102 have an inward taper 104. A cutting guide 11 is disposed above composites 102 for creating an incrementally shorter composite ply 105. A prepreg band 10 initially extends from point L on the composite over cutting guide edge 36. Once the band is cut at the cutting guide edge it is pressed against the taper plane 104. The radius between L and A is equal to the radius between L and B. It is essential that the cutting guide not interfere with the laydown of cut bands. Therefore, the cutting guide face 114 must be outside of the radial arc AB.

Figure 8:
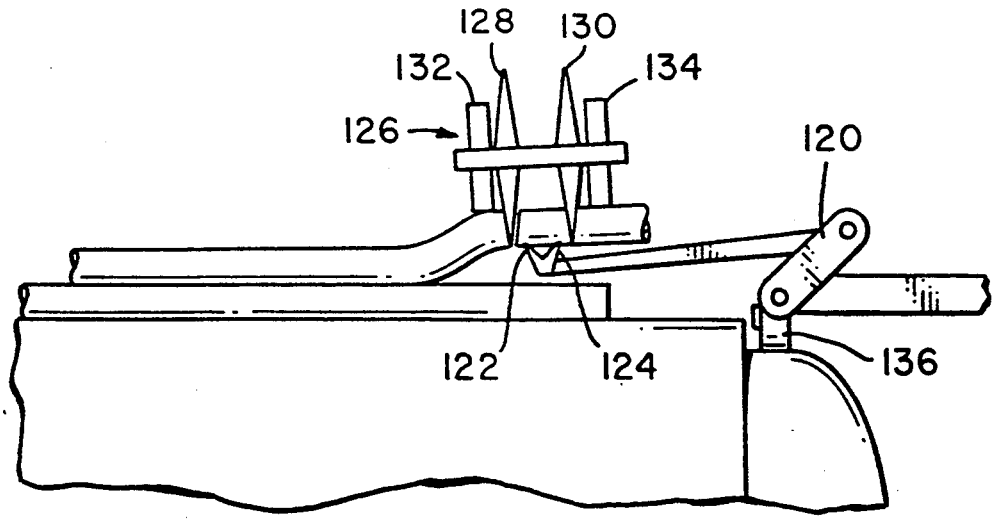
FIG. 8 is a partial side view of an alternate embodiment of the present invention.

FIG. 8 shows an alternate embodiment of the present invention, in which the cutting guide 120 has two edges 122 and 124. The cutting tool 126 has two blades 128 and 130 which are separated from each other by a distance which is slightly greater than the distance between the two cutting guide edges 122 and 124. Outside of the blades 128 and 130, the cutting tool has two compacting rollers 132 and 134 for pressing the cut filament band ends against the composite or against the dome section outboard of the mandrel. The cutting guide 120 is also provided with a bearing or roller 136 for minimizing friction between the rotating mandrel and the cutting guide.

By employing the preferred device embodiments, as described above with reference to the drawings, the following advantageous method for making a tapered scarf joint between two tubular composites, is derived.

A first ply of helical composite fibers are wound around a mandrel of a filament winding machine. The mandrel rotates around an axis, as composite fibers are delivered from a winding eye which reciprocates along a line parallel to the mandrel axis.

Next, a cutting guide is positioned adjacent to an end of the first ply. An edge of the cutting guide is positioned above the ply an incremental distance inward from the first ply end.

An additional ply of helical composite fibers is then wound on top of the first ply. The additional ply fibers are cut at the cutting guide edge forming an additional ply end, so that the additional ply is shorter then the previous ply by the incremental distance.

Next, the cutting guide edge is moved to a new position above the additional ply an incremental distance inward from the additional ply end. Then the winding, cutting and moving steps are repeated N times until the desired number of plies, minus one, are wound.

The cutting guide is removed from the mandrel, and a final ply is wound along the entire length of the first ply. The resulting first tubular composite has N+3 helical plies and an inward taper at its joint end. N is the number of times a ply was wound and cut after moving the cutting guide. Since two plies were wound prior to "moving" the guide, and one ply was wound after "removing" the cutting guide, there are finally a total of N+3 helical plies plus the required number of hoop plies.

A metal sleeve is placed around the composite, fixing the dimension and taper angle prior to curing. After the composite is cured, it is removed from the mandrel.

A slightly different process is used to produce the outwardly tapered composite end. First, a ply of helical composite fibers is wound around a mandrel of the filament winding machine. However, this time the mandrel has a taper wedge attached at one end. The first composite ply extends up the wedge incline.

Next, the cutting guide s positioned along the taper wedge near the beginning of the wedge incline. A second ply is then wound and cut, so that the second ply ends approximately at the beginning of the wedge incline. The cutting guide is then moved outwardly and axially from the composite, an incremental distance up the wedge incline.

The winding, cutting and moving step are then repeated N times until the desired number of plies, minus one, have been wound and cut. The cutting guide is then removed, and a final ply is wound extending over the entire length of the composite. Thus the second composite has N+3 helical plies, two wound prior to "moving" the cutting guide, N plies after repeating the winding, cutting and moving steps, and one wound after removing the cutting guide.

The metal sleeve is then applied, and the composite is allowed to cure. The cured composite is removed from the mandrel. The result is a second composite having an outwardly tapered end which can be adhesively joined to the inwardly tapered end of the first composite to produce the tapered scarf joint.

It is evident from the Figures and accompanying description that in theory the described device and method produce a step-wise interface in accordance with the incremental movement of the cutting guide. However, by making the increments small, for example fifteen to twenty thousandths of an inch, a gradual incline can practically be produced. This objective is further aided by the outer plies which cover the taper faces, and by the prepreg resin and bonding adhesive which tend to fill in any discontinuous regions along the taper plane.

It will be evident upon examination of the following claims, that the present invention is not limited to the above description of the preferred embodiments. The claimed invention is intended to include modifications which would be obvious to a person having ordinary skill in the art.

What is claimed is:

1. A method of producing a tapered scarf joint between two tubular composite ends, comprising the steps of:
   producing an inwardly tapered tubular composite end on a filament winding machine by incrementally moving a cutting guide edge inwardly as successively shorter prepreg filament plies are wound and cut at the cutting guide edge;
   producing an outwardly tapered tubular composite end on a filament winding machine by incrementally moving a cutting guide edge outwardly as successively longer prepreg filament plies are wound and cut at the cutting guide edge, the taper angle of the outward composite end being equal to the taper angle of the inward composite end; and
   securely joining the tapered composite ends.

2. The method of claim 1, wherein the joining step includes applying an adhesive between the tubular composite ends.

3. The method of claim 2, wherein the adhesive used in the joining step is either a polyamide cured adhesive or a hot melt adhesive, so that the joint can be made and broken by applying heat.

4. A method for making a tapered scarf joint between two tubular composites, comprising the steps of:
   a) producing a first ply of helical composite fibers around a mandrel of a filament winding machine, wherein the mandrel rotates around an axis, and composite fibers are delivered from a winding eye which reciprocates along a line parallel to the mandrel axis;
   b) positioning a cutting guide adjacent to an end of the first ply, an edge of the cutting guide being positioned above the ply an incremental distance inward from the first ply end;
   c) winding an additional ply of helical composite fibers on top of the first ply;
   d) cutting the additional ply fibers at the cutting guide edge forming an additional ply end, so that the additional ply is shorter then the previous ply by the incremental distance;
   e) moving the cutting guide edge to a position above the additional ply an incremental distance inward from the additional ply end;
   f) repeating steps c), d) and e) N times;
   g) removing the cutting guide from the mandrel;
   h) winding a final ply along the entire length of the first ply, creating the first tubular composite having N+3 helical plies and an inward taper at its joint end;
   i) curing the first tubular composite and removing it from the mandrel;
   j) repeating the providing step, wherein one end of said mandrel has a taper wedge having an incline point where the mandrel meets the wedge, the first ply extending up the taper wedge;
   k) positioning the cutting guide edge at the incline point;
   l) repeating step c);
   m) cutting the additional ply fibers at the cutting guide edge forming an additional ply end, so that the additional ply ends near the incline point;
   n) moving the cutting guide edge to a new position on the taper wedge an incremental distance outward from the additional ply end;
   o) repeating steps l), m) and n) N times;
   p) removing the cutting guide from the mandrel;
   q) winding a final ply along the entire length of the first ply, creating the second tubular composite having N+3 helical plies and an outward taper at its joint end;
   r) curing the second tubular composite and removing it from the mandrel; and s) adhesively connecting the first tubular composite tapered end to the second tubular composite tapered end, forming a tapered scarf joint.

5. The method of claim 4, wherein steps d) and m) include smoothing the cut fibers against the mandrel.

6. The method of claim 4, wherein the cutting guide of steps b) and j) does not contact the previously wound ply.

7. The method of claim 4, wherein steps d) and m) are performed by applying a blade against the cutting guide edge.

8. The method of claim 4, further comprising the step of:
   sliding a metal sleeve over the first and second tubular composites prior to steps i) and r), so that the final dimension and taper angle of the tubular composites are fixed.

9. The method of claim 4, wherein the incremental distance is between 15 and 20 thousandths of an inch.

10. The method of claim 4, wherein the mandrel of the providing steps has a shoulder for supporting a main body portion of the cutting guide in a fixed location relative to the mandrel axis.

11. The method of claim 10, wherein the cutting guide of the positioning steps has a pair of hinges connecting the cutting guide edge to the main body portion, so that the cutting guide edge is moveable relative to the mandrel axis while the main body portion is maintained against the mandrel shoulder.

12. A method for producing a tapered scarf joint between two tubular composite ends, comprising the steps of:
   producing a first composite having an inwardly tapered tubular composite end, by mechanically translating a cutting guide incrementally inward to guide a cutting means to cut a stacked series of helically wound tacky filament plies, each ply being cut incrementally shorter than the previous ply before the next ply is wound;
   producing a second composite having an outwardly tapered tubular composite end, by mechanically translating a cutting guide incrementally outward to guide a cutting means to cut a stacked series of helically wound tacky filament plies, each ply being cut incrementally longer than the previous ply before the next ply is wound;
   bonding the first composite end to the second composite end to produce a tapered scarf joint.

13. The method of claim 12, wherein the cutting referred to in the producing steps is performed filament by filament during the winding process.

14. The method of claim 13, wherein the cutting guide has an edge against which each filament is cut.

15. The method of claim 14, further comprising the steps of:
   winding a final composite ply over the inwardly tapered tubular composite end; and
   winding a preliminary composite ply up a tapered wedge incline prior to producing the second composite, wherein the preliminary ply defines the second composite's taper face against which the stacked plies are laid, whereby the composite ends are smoother and the stacked plies are less likely to delaminate.

16. An apparatus for producing a tapered scarf joint between two tubular composite ends, comprising:
   means for producing an inwardly tapered tubular composite end on a filament winding machine by incrementally moving a cutting guide edge inwardly as successively shorter tacky filament plies are wound and cut at the cutting guide edge;
   means for producing an outwardly tapered tubular composite end on a filament winding machine by incrementally moving a cutting guide edge outwardly as successively longer tacky filament plies are wound and cut at the cutting guide edge, the taper angle of the outward composite end being equal to the taper angle of the inward composite end; and
   means for securely joining the tapered composite ends.

* * * * *